US008799226B2

(12) United States Patent
Haselton et al.

(10) Patent No.: US 8,799,226 B2
(45) Date of Patent: Aug. 5, 2014

(54) PRIORITIZATION OF DATA ITEMS FOR BACKUP IN A COMPUTING ENVIRONMENT

(75) Inventors: William Robert Haselton, Nashua, NH (US); David Gregory Van Hise, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/892,828

(22) Filed: Sep. 28, 2010

(65) Prior Publication Data

US 2012/0078852 A1    Mar. 29, 2012

(51) Int. Cl.
 *G06F 17/00* (2006.01)
(52) U.S. Cl.
 USPC ............ 707/654; 707/655; 707/661; 707/674
(58) Field of Classification Search
 CPC .......... G06F 17/30082; G06F 17/3015; G06F 17/30076; G06F 17/30073; G06F 17/30345
 USPC .................. 707/654, 655, 661, 674
 See application file for complete search history.

(56) References Cited

U.S. PATENT DOCUMENTS

| 7,996,718 | B1 * | 8/2011 | Ou et al. .......................... 714/23 |
| 8,180,734 | B1 * | 5/2012 | Thilmony et al. ............. 707/640 |
| 2007/0033356 | A1 * | 2/2007 | Erlikhman ..................... 711/162 |
| 2008/0046483 | A1 | 2/2008 | Lehr et al. |
| 2008/0077682 | A1 * | 3/2008 | Nair et al. ..................... 709/223 |
| 2008/0077736 | A1 * | 3/2008 | Mukherjee et al. ........... 711/114 |
| 2008/0104145 | A1 | 5/2008 | Lipman et al. |
| 2008/0133622 | A1 | 6/2008 | Brown et al. |
| 2011/0184918 | A1 * | 7/2011 | Atluri et al. ................... 707/683 |

FOREIGN PATENT DOCUMENTS

| CN | 101188599 | 5/2008 |
| CN | 101627382 | 1/2010 |

OTHER PUBLICATIONS

Chinese Office Action dated Dec. 4, 2013 for CN App. No. 201110296841.8 filed Sep. 27, 2011.
Information Materials for IDS dated Dec. 11, 2013 or CN App. No. 201110296841.8 filed Sep. 27, 2011.
English Translation of CN101627382 dated Jan. 13, 2010.
English Translation of CN101188599 dated May 28, 2008.

* cited by examiner

*Primary Examiner* — Shahid Alam
*Assistant Examiner* — Andalib Lodhi

(57) ABSTRACT

Described are embodiments of an invention for prioritizing data items for backup in a computing environment. The computing environment includes a plurality of clients coupled through a network to a backup system for backing up items stored locally on the client. Each client includes a continuous data protection (CDP) module that prioritizes the order of files transmitted to the backup system for storage on one or more storage devices based on policy. The CDP module builds an initial backup list and a CDP backup list. The initial backup list includes any item that meets the criteria of the initial backup profile. The CDP backup list includes items that have been modified since the initial backup process began. The data that is the most critical to a user is often the most recently modified data. Thus, the CDP module preferentially performs a backup of items on the CDP backup list.

25 Claims, 8 Drawing Sheets

PRIORITIZATION OF DATA ITEMS FOR BACKUP IN A COMPUTING ENVIRONMENT

TECHNICAL FIELD

The invention relates to computing environments capable of performing backup operations.

BACKGROUND

Data operations such as read and write operations are commonly performed by all computers. Further, data operations can be combined to perform specialized data operations such as data backup. In particular, continuous data protection (CDP) refers to the backup of computer data by immediately saving a copy of every change made to data automatically, instead of scheduling periodic backups.

Upon installation of a backup product such as CDP, a full backup is performed. Once the full backup is completed, the CDP product then performs a backup of any incremental change made to the data. Typically, the backup product is deployed simultaneously to a large number of users within an enterprise and all of the users within the enterprise share the same backup target storage location. Accordingly, the network may become overloaded during the full backup process. When the network becomes overloaded the full backup process can take an extended period of time, such as multiple weeks, to complete. The most critical data to an enterprise is commonly the data that is most recently accessed, and/or changed. Thus, during the full backup process, any changes that occur to this most critical data are not be backed up until the lengthy full backup process is complete.

SUMMARY OF THE INVENTION

Described are embodiments of an invention for prioritizing data items for backup in a computing environment. The computing environment includes a plurality of clients coupled through a network to a backup system for backing up items stored locally on the client. Each client includes a continuous data protection (CDP) module that prioritizes the order of files transmitted to the backup system for storage on one or more storage devices based on policy. The CDP module builds an initial backup list and a CDP backup list. The initial backup list includes any item that meets the criteria of the initial backup profile. The CDP backup list includes items that have been modified since the initial backup process began. The data that is the most critical to a user is often the most recently modified data. Thus, the CDP module preferentially performs a backup of items on the CDP backup list.

For example, an embodiment of a computer implemented method for prioritizing a backup process in a computing environment having at least one client coupled to a backup system includes determining if a continuous data protection (CDP) list of the first client includes at least one CDP item for backup while performing an initial backup process of an initial backup list of the first client which includes at least one initial backup item. The method throttles the initial backup process of the initial backup list and performs a backup of the at least one CDP item on the CDP list if it is determined that continuous data protection (CDP) list includes at least one CDP item for backup. Throttling of the initial backup system includes pausing the initial backup process or slowing the initial backup process below a preliminary backup rate. In one embodiment the initial backup items and the CDP items are files.

The method also resumes the performance of the initial backup process of the initial backup list of the first client including at least one initial backup item if it is determined that the CDP list of the first client does not include at least one CDP item for backup. In addition, the method compares the backup system timestamp of the initial backup item with the client timestamp of the initial backup item and transmits the initial backup item for backup to the backup system only if the client timestamp is more recent than the backup system timestamp.

In one embodiment, the CDP backup list includes a plurality of CDP items. The plurality of CDP items on the CDP backup list are ordered according to policy such that the CDP items are backed up preferentially based on the order. Further, the policy may require that the CDP items on the CDP backup list be ordered based on a time of the last modification of the CDP item such that the most recently modified CDP item is backed up first. Additionally, the policy may require that the CDP items be ordered on the CDP backup list such that the CDP items which have previously been deduplicated are backed up prior to CDP items which have not been previously deduplicated. In one embodiment, the initial backup list includes a plurality of initial backup items. The plurality of initial backup items are ordered on the initial backup list. In one embodiment, the order of the initial backup items is based on policy such that the initial backup items which have previously been deduplicated are backed up prior to initial backup items which have not been previously deduplicated.

Finally, in one embodiment, the method includes determining if a processor utilization of a backup system is less than a processor utilization threshold and determining if the network usage between a client and the backup system is greater than a network usage threshold. In this embodiment, compression is performed on the selected item if it is determined that the processor utilization of the backup system is less than the processor utilization threshold and the network usage between the client and the backup system is greater than the network usage threshold.

In an embodiment of a computer program product which includes a computer useable medium including a computer readable program the computer readable program when executed on a computer causes the computer to perform an initial backup process of an initial backup list including at least one initial backup file. The computer is further caused to determine if a CDP list includes at least one CDP item for backup while performing the initial backup process of the initial backup list. If it is determined that the CDP list includes at least one CDP item for backup, then the computer is further caused to throttle the initial backup process of the initial backup list.

In another embodiment of a computing environment, the environment includes memory coupled to a processor. The memory includes instructions implemented by the processor to determine if a continuous data protection (CDP) list includes at least one CDP file for backup while performing an initial backup process of an initial backup list including at least one initial backup. Further, the processor throttles the initial backup process of the initial backup list including at least one initial backup file and performs a backup of up the at least one CDP file on the CDP list in response to determining that a CDP list includes at least one CDP file for backup.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF THE PREFERRED EMBODIMENT

Described are embodiments of an invention for prioritizing data items for backup in a computing environment. The computing environment includes a plurality of clients coupled through a network to a backup system for backing up items stored locally on the client. Each client includes a continuous data protection (CDP) module that prioritizes the order of files transmitted to the backup system for storage on one or more storage devices based on policy. The CDP module builds an initial backup list and a CDP backup list. The initial backup list includes any item that meets the criteria of the initial backup profile. The CDP backup list includes items that have been modified since the initial backup process began. The data that is the most critical to a user is often the most recently modified data. Thus, the CDP module preferentially performs a backup of items on the CDP backup list.

Further, the CDP module orders the initial backup list based on policy. For example, the CDP module backs up the initial backup list such that the item with the most recently accessed initial backup item is backed up first. In an additional embodiment, the CDP module preferentially backs up the items on the initial backup list that have been deduplicated. In addition, the CDP module orders the CDP backup list based on policy. For example, the CDP module backs up the CDP backup list such that the item with the most recently modified CDP backup item is backed up first. In an additional embodiment, the CDP module preferentially backs up the items on the CDP backup list that have been deduplicated.

It will be obvious, however, to one skilled in the art, that embodiments of the present invention may be practiced without some or all of these specific details. In other instances, well known process operations have not been described in detail to prevent obscuring the embodiments of the present invention described herein.

Figure 1:
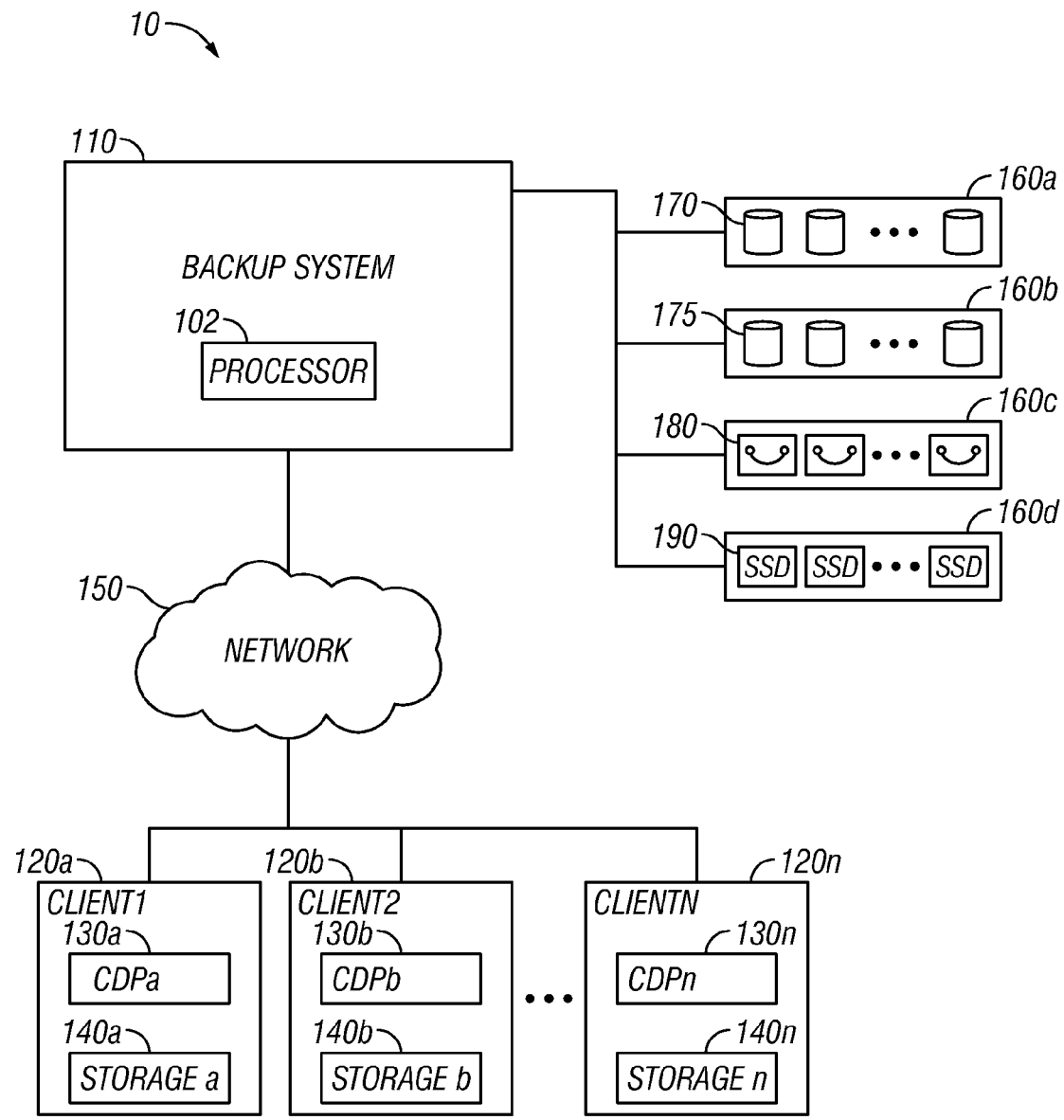
FIG. 1 illustrates computing environment that performs data operations in accordance with an embodiment of the invention.

In accordance with one embodiment, FIG. 1 is a diagram illustrating a computing environment 10 that performs data operations, such as read operations, write operations, backup operations, and the like. The computing environment 10 includes computing systems such as a backup system 110 and client(s) 120a, 120b . . . 120n. The backup system 110 and client(s) 120a, 120b . . . 120n communicate with each other via a network 150. In one embodiment, for example, backup system 110, could be a file server, IBM Tivoli® Storage Manager (TSM) server, a web application server, or a Network-attached storage (NAS). Backup system 110 may also be part of a Storage Area Network (SAN) network. Backup system 110 may include processor 102 capable of executing program code.

Each client 120a, 120b . . . 120n may include local storage 140a, 140b, . . . 140n, respectively. In practice, the local storage 140 can be a magnetic disk drive, or solid state storage device, such as a flash memory. In addition, each client 120a, 120b . . . 120n may include continuous data protection (CDP) module 130a, 130b . . . 130n, respectively. It should be appreciated that CDP module 130a, 130b . . . 130n can be a software module, firmware module, or combination software/firmware module that enables data backups using the inventive concepts described herein.

It should be appreciated that the computing system(s) can be any device capable of processing data, such as, a server, mainframe, personal computer, laptop, or mobile device, which includes smartphones and the like. It should be understood by one of ordinary skill in the art that the computing systems can include additional components such as at least one processor, memory, a network adapter, and antenna that are managed by an operating system.

Further, the computing device may include a user interface, such as a keyboard, touchscreen, or pointing device that enables user input. Finally, the computing device may include a user viewable screen displaying a graphical user interface (GUI) or text-based interface, such as a Command Line Interface (CLI).

Many general or special purpose operating systems exist that manage the components of the computing system, such as Lunix, or other Unix-type operating systems and Microsoft Windows-style operating systems. The operating systems can organize data using "file systems," which are data repositories for files.

In one embodiment, as illustrated by FIG. 1, storage devices, such as storage arrays, can include disk arrays 160a/160b, a tape array 160c, and a solid state device array 160d, which may be organized under a Redundant Array of Inexpensive/Independent Disks (RAID) level. The disk array 160a can include magnetic disks 170 and the disk array 160b can include optical disks 175. In contrast, the tape array 160c can include tapes 180 and the solid state device array 160d can include solid state devices (SSDs) 190. It should be appreciated that one may combine the magnetic disks, optical disks, tapes, and SSDs on a single array.

Network 150 may include any number of switches, routers, and other specialized network computing devices providing data transfer services between computing systems of the computing environment 10. Accordingly, the backup system 110 can bi-directionally communicate data to and from the client(s) 120a, 120b . . . 120n. Specifically, client 120a, 120b . . . 120n may request the services of the backup system 110, by exchanging data packets over the network 150. The client 120a, 120b . . . 120n may issue data packets using file-based access protocols or block-based access protocols. Such protocols are common and include the Common Internet File System (CIFS) protocol, Network File System (NFS) protocol, Transmission Control Protocol/Internet Protocol (TCP/IP), Small Computer Systems Interface (SCSI) protocol encapsulated over TCP (iSCSI) and SCSI encapsulated over Fibre Channel (FCP). It should be appreciated that any computing system may communicate with any other computing system of the computing environment 10 in this manner.

As a further example of performing data backup operations, source information from the client 120a, 120b ... 120n can be organized by the backup system 110 for backup storage on one or more storage devices 160a, 160b, 160c, and 160d accessible by the backup system 110. To enable data storage on a storage device 160a, 160b, 160c, and/or 160d, the backup system 110 may present logical representations of the physical storage devices as "volumes" to the client 120a, 120b ... 120n. The volumes, or data repositories, represent any logical combination of physical disks, tapes, or SSDs, and can be selected by the backup system 110 for storing backup data. By enabling data operations over a computing environment 10 such as the one illustrated on FIG. 1, the computing environment 10 can be a distributed storage management system.

It should be understood that herein, for simplicity, and without further limiting the invention, client(s) 120a, 120b ... 120n may be used interchangeably with client 120. Similarly, continuous data protection (CDP) module(s) 130a, 130b ... 130n will be used interchangeably with continuous data protection (CDP) module 130. In addition, local storage 140a, 140b, ... 140n will be used interchangeably with local storage 140. Finally, storage devices 160a, 160b, 160c, and 160d may be used interchangeably with storage device 160.

Figure 2:
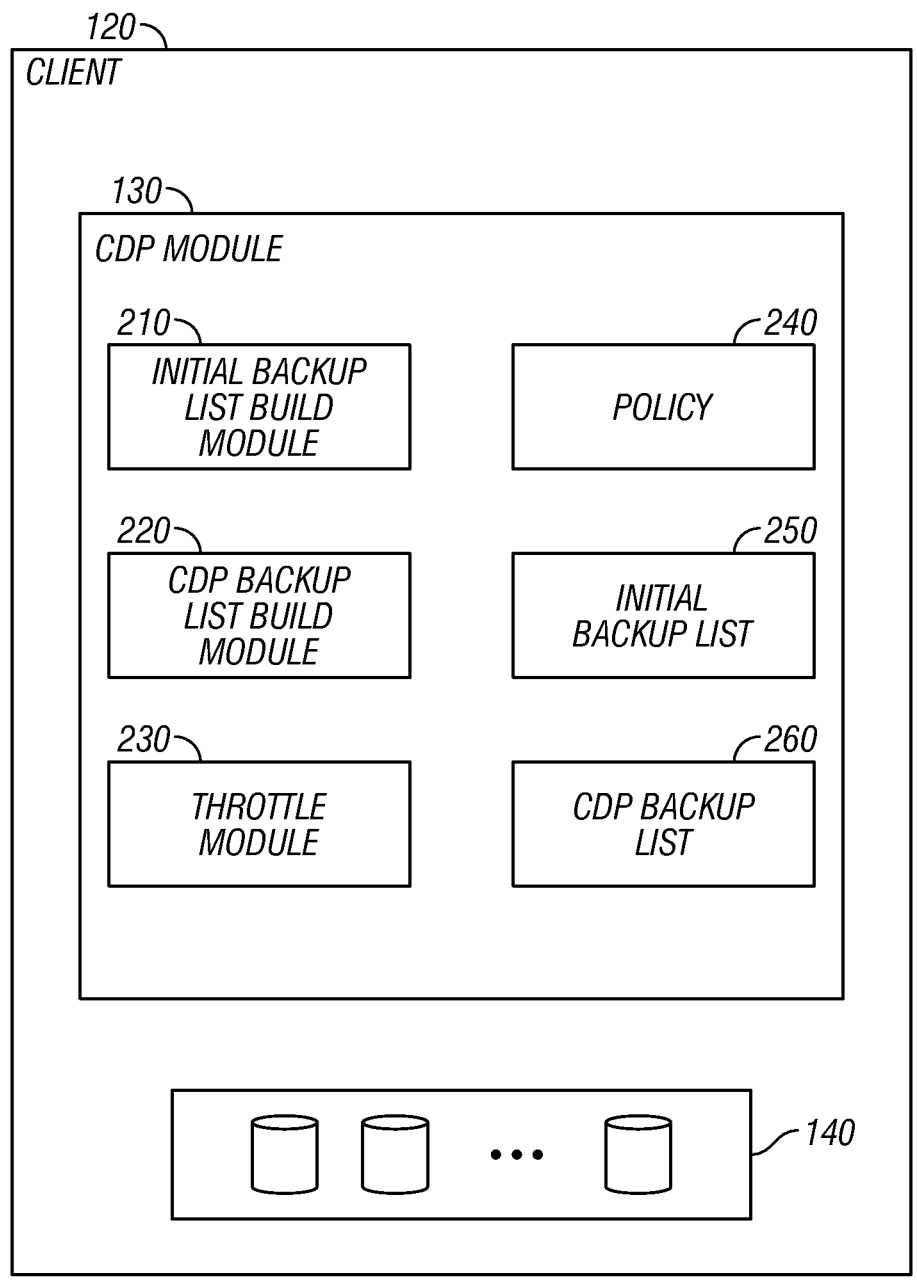
FIG. 2 illustrates a detailed view of a client in a computing environment in accordance with an embodiment of the invention.

FIG. 2 illustrates an exemplary client 120 in accordance with an embodiment of the invention. As discussed above, client 120 includes CDP module 130 and local storage 140. CDP module includes an initial backup list build module 210, a CDP backup list build module 220, a throttle module 230, CDP policy 240, hereinafter referred to as policy, an initial backup list 250 and a CDP backup list 260. Policy 240, for example, may be created by a user, an Information Technology (IT) administrator, or other administrator, or alternatively, it may be preconfigured by the manufacturer.

CDP module 130 transmits items stored on local storage 140 to backup system 110. Backup system 110 receives the transmission of the items and stores the items on one or more storage devices 160. The initial backup list build module 210 builds a list (initial backup list 250) of all items to be backed up in an initial backup process according to policy 240 as described below with reference to FIG. 3. Similarly, CDP backup list build module 220 builds a list (CDP backup list 260) of items that are modified during the initial backup process as described below with reference to FIG. 4. As described above, the data that is the most critical to a user is often the most recently modified data. Thus, the CDP module 130 preferentially performs a backup of items on the CDP backup list 260. The throttle module 230 throttles the processing of the initial backup list 250 so that the CDP backup list 260 can be backed up preferentially as described with respect to FIGS. 5A and 5B below.

Figure 3:
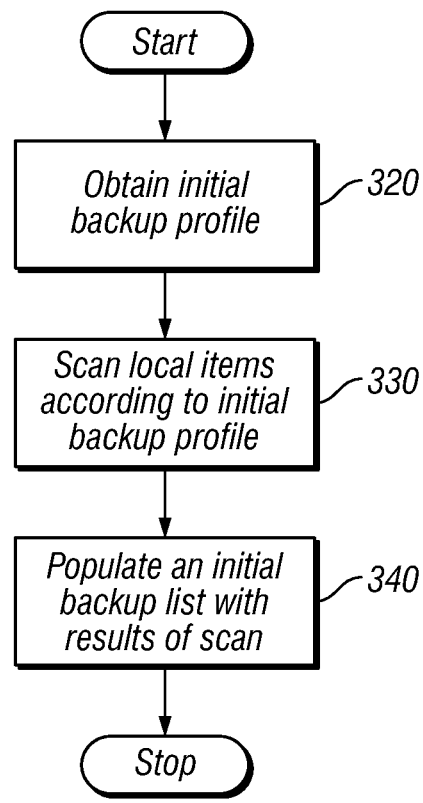
FIG. 3 is a flow chart of operations for building an initial backup list in accordance with an embodiment of the invention.

FIG. 3 is a flow chart of operations for creating the initial backup list 250 of CDP module 130. In step 320, the initial backup build module 210 obtains the initial backup profile for the client 120. The initial backup profile includes a list of criteria to determine which items in local storage 140 should be backed up. In one embodiment, the items to be backed up are files. In one embodiment, policy 240 comprises the initial backup profile. The initial backup profile may be created utilizing a configuration program or wizard. Alternatively, the initial backup profile may be created in the same manner as describe above for creating policy 240.

In one example, a user may wish to backup any item within a particular folder or subfolder, such as an email folder or a "My documents" folder. Accordingly, in this example, the user would add all email folders and the "My documents" folder as part of the criteria for backing up in the initial backup profile. As one skilled in the art would understand, alternative or additional criteria may be used to create the initial backup profile. For example, additional criteria may include the file creation date, the last accessed date, or the size of the file.

Once the initial backup list build module 210 obtains the initial backup profile for the client 120, the process flows to step 330. In step 330 the initial backup build module 210 scans the local items stored on local storage 140 according to the initial backup profile. For example, the initial backup build module 210 scans each of the local items stored on local storage 140 and compares each item to the criteria in the initial backup profile of policy 240. In one embodiment, for example, if the user configured the criteria in the initial backup profile to backup any file in an email folder, the initial backup build module 210 scans each of the local files stored on local storage 140 and determines if the file meets the criteria of being in an email folder.

In step 340, the initial backup list build module 210 populates an initial backup list 250 with the results of the scan. If the item meets the criteria of the initial backup profile the initial backup build module 210 adds the item to the initial backup list 250. One of ordinary skill in the art would understand that the initial backup list build module 210 could populate the initial backup list 250 upon completion of scanning all of the local items according to the initial backup profile, or alternatively, the initial backup list build module 210 could populate the initial backup list 250 "on-the-fly" as it encounters items that meet the initial backup profile. The process of building the initial backup list 250 stops after step 340.

The items on the initial backup list 250 may be ordered in any number of ways according to policy 240. For example, the items on the initial backup list 250 may be ordered utilizing a hash table or tree structure or any other data structure known in the art. In one embodiment, the items on the initial backup list 250 may be in the order in which the items were discovered in the scan of the system performed in step 330. In other embodiments, the items on the initial backup list 250 may be ordered by the criteria inputted at the time of creation of the initial backup profile. For example, the user may wish to order the list based on the size of item or file, last modified date of the item, or by the item folder type, etc. In another embodiment, the initial backup list 250 may be ordered by the last accessed date of the item such that the items with the most recent access dates are listed first. Accordingly, the CDP module 130 preferentially performs a backup of the most recently accessed items on the initial backup list 250 prior to performing a backup of items that were less recently accessed. As discussed above, the data that is the most critical to a user is often the most recently modified and/or accessed data. Thus, the CDP module 130 ensures that the data most critical to the user is preferentially backed up.

In one embodiment, the initial backup list 250 may be built by the initial backup list build module 210 a single time to ensure a full backup of all initial backup items. In yet another embodiment, the initial backup list 250 may be built multiple times. For example, the criteria for the initial backup profile of policy 240 may be modified such that additional items would be included on the initial backup list 250. Therefore, in one embodiment, the steps to build the initial backup list 250 described in FIG. 3 would be repeated, as necessary, in order to reflect the changes to policy 240.

Figure 4:
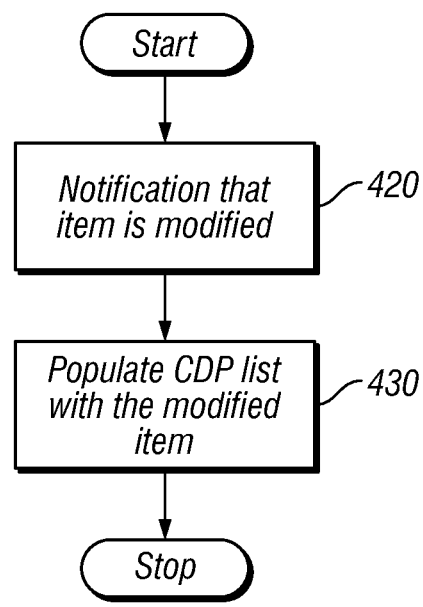
FIG. 4 is a flow chart of operations for building a CDP backup list in accordance with an embodiment of the invention.

FIG. 4 is a flow chart of operations for creating the CDP backup list 260. In step 420, the CDP module 130 obtains notification that one or more items are modified. In response, the CDP backup list build module 220 populates the CDP backup list 260 with the one or more modified items. The items on the CDP backup list 260 may be ordered in any number of ways based on policy 240. For example, the items on the CDP backup list 260 may be ordered utilizing a hash table or tree structure or any other data structure known in the art. In one embodiment, policy 240 may be set such that the items on the CDP backup list 260 may be in the order in which they were last modified. For example, in one embodiment the items on the CDP backup list 260 may be ordered based on policy 240 such that the most recently modified item is first on the CDP backup list 260.

Figure 5A:
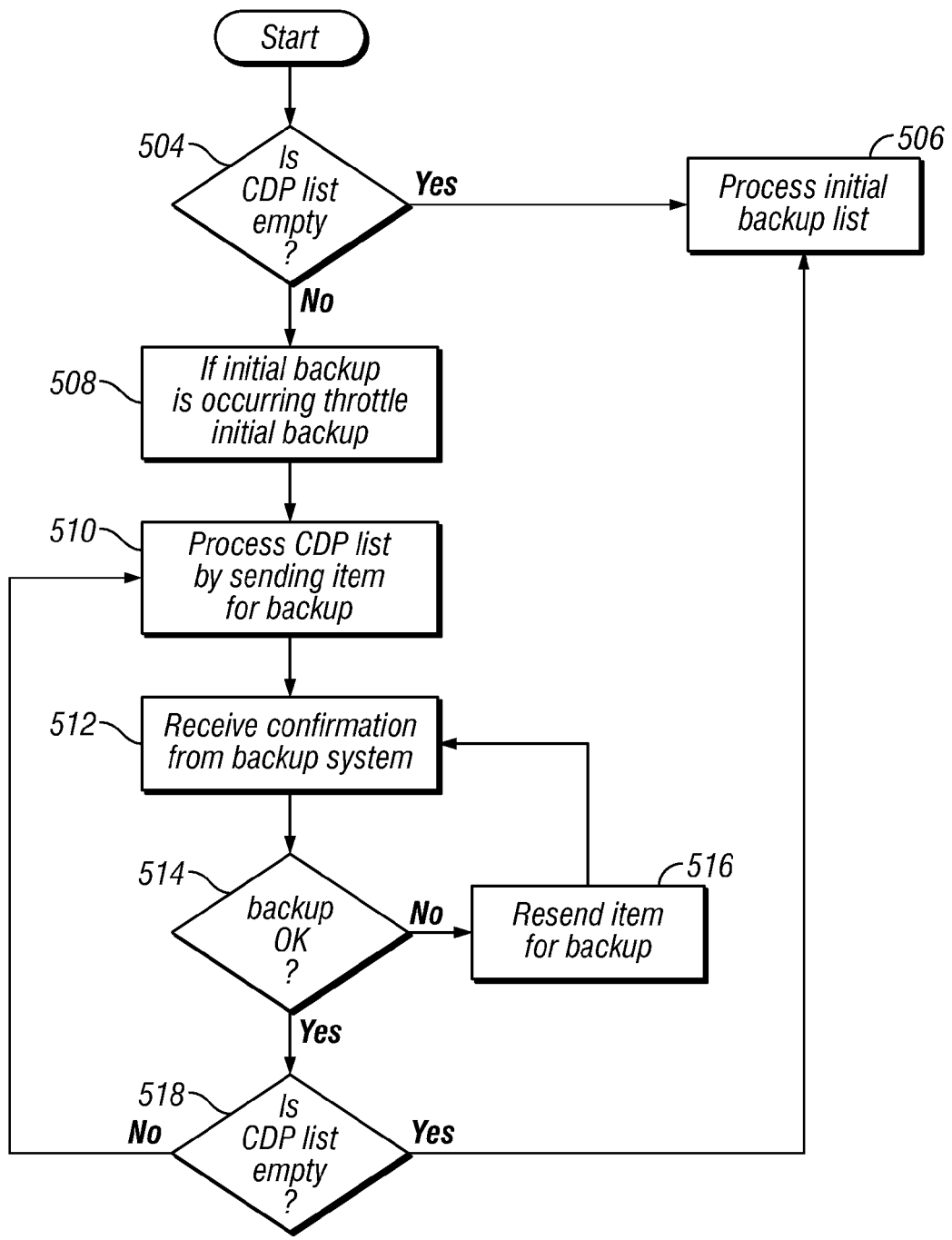
FIG. 5A is flow chart illustrating a portion of a backup process in accordance with an embodiment of the invention.

FIG. 5A is a flow chart of operations for performing a portion of a back up process on items stored on local storage 140 of a client 120 in accordance with an embodiment of the invention. In step 504, the CDP module 130 determines if the CDP backup list is empty (i.e. the CDP backup list does not include at least one CDP item). If the CDP backup list 260 is empty, then the CDP module 130 processes the initial backup list 250 in step 506 at a preliminary backup rate. The preliminary backup rate is based, in part on the bandwidth of network 150 and the processing speed of processor 102. The operations for processing the initial backup list 250 are further described with respect to FIG. 5B below.

If the CDP backup list includes at least one CDP item to backup, then the process flows to step 508. In step 508, if an initial backup process is occurring, then the throttle module 230 of the CDP module 130 throttles the initial backup process.

In one embodiment, throttling the initial backup process includes slowing down the processing of the initial backup list 250 below the preliminary backup rate. Throttling the initial backup process allows most of the backup resources (e.g. bandwidth of network 150 and utilization of processor 102) to be used to process the CDP backup list 260. In another embodiment, throttling the initial backup process includes pausing the processing of the initial backup list 250 such that the resources can be dedicated to backing up the CDP backup list 260. Accordingly, in both of the above described embodiments, the CDP module 130 preferentially performs a backup of items on the CDP backup list 260. Once the throttle module 230 throttles the initial backup process, the CDP module 130 processes the CDP backup list 260 in step 510. In the embodiment in which throttling includes slowing down the processing of the initial backup list 250, the CDP module 130 processes the CDP backup list 260 and the initial backup list 250 concurrently. However, in this embodiment, the CDP module 130 preferentially processes the CDP backup list 260 by utilizing most of the backup resources to process the CDP backup list 260.

The CDP module 130 processes the CDP backup list 260 by transmitting the first item on the CDP backup list 260 to the backup system 110 over network 150. The backup system 110 receives the transmission of the first item on the CDP backup list 260 and stores the first item in one or more of the storage devices 160.

As discussed with respect to FIG. 4 above, the CDP backup list 260 may be ordered in any number of ways according to policy 240. Therefore, in an embodiment in which the CDP backup list 260 is ordered such that the most recently modified item is first on the CDP backup list 260. Accordingly, the CDP module 130 transmits the most recently modified item to the backup system 110 over network 150 for storage in one or more of the storage devices 160. As discussed previously, often the most critical data is the data that is most recently modified. Therefore, in this way, the CDP module 130 ensures that the most recently modified and, thus, the most critical data is backed up first.

In step 512, the CDP module 130 receives confirmation from the backup systems 110 regarding backup of the item on the CDP backup list 260 transmitted in step 510. In step 514, the CDP module 130 determines from the confirmation, transmitted in step 512, if the backup process completed successfully. For example, the CDP module may receive a return code that contains a zero, indicating that the backup was performed successfully (i.e. without errors). On the other hand, the return code may include an error code, indicating that the backup was not successfully performed. If the CDP module 130 determines in step 514 that the backup process was not completed successfully, then the process flows to step 516. In step 516, the CDP module 130 retransmits the item transmitted in step 510 to the backup system 110, and the process flows back to step 512. On the other hand, if the CDP module 130 determines in step 514 that the backup process was completed successfully, then the process flows to step 518.

In step 518, the CDP module 130 determines if the CDP backup list 260 is empty. If the CDP module 130 determines that the CDP backup list 260 is not empty (i.e. the CDP list includes at least one CDP item for backup), then the process returns to step 510. In step 510, the CDP module 130 continues to process the CDP backup list 260 by transmitting the next item on the list for backup as described above. On the other hand, if the CDP module 130 determines that the CDP backup list 260 is empty, then the process flows to the step 506. In step 506, the CDP module 130 processes the initial backup list 250. In one embodiment, processing the initial backup list 250 includes beginning processing, or resuming processing, of the initial backup list 250 at the preliminary backup rate.

Figure 5B:
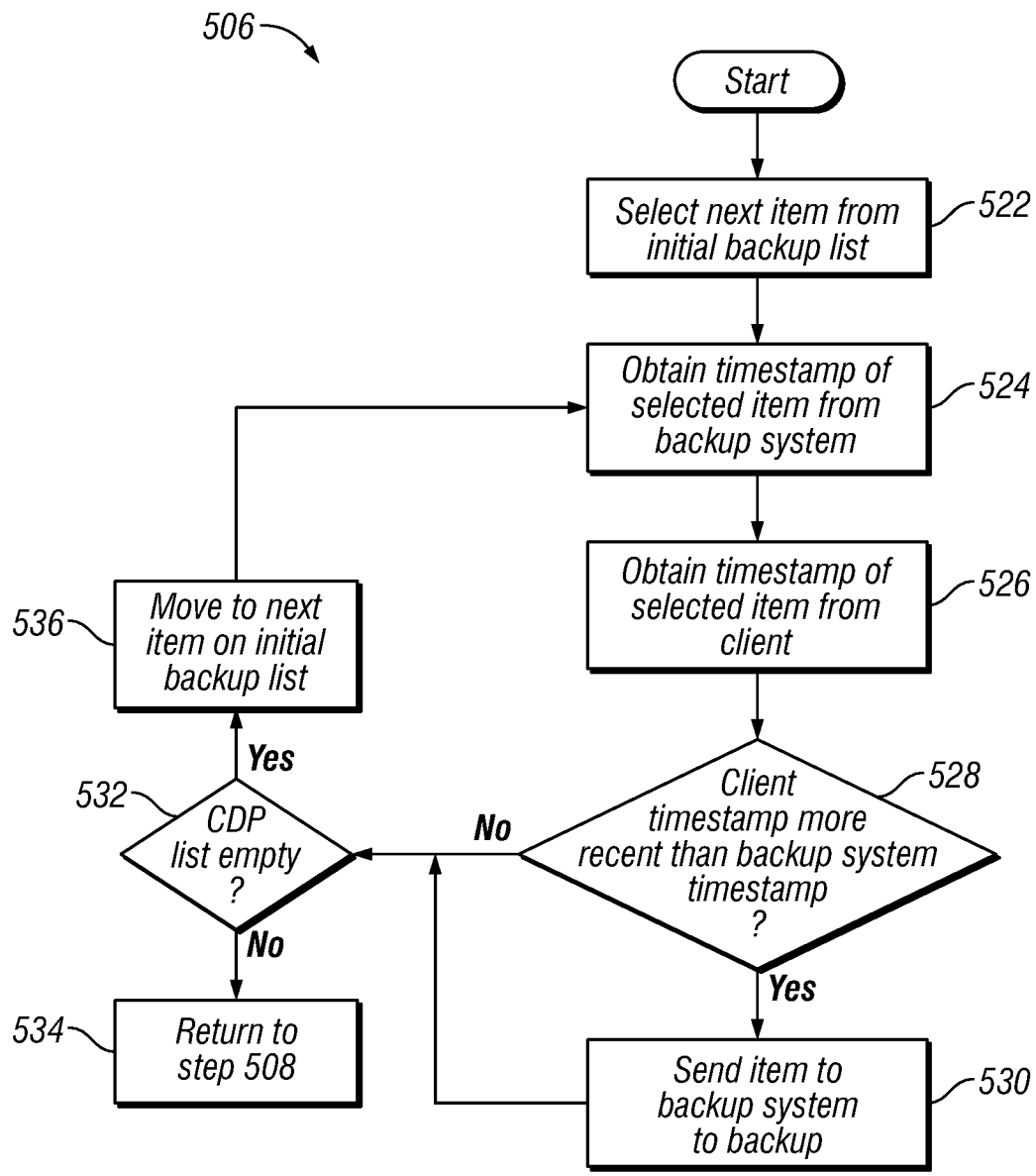
FIG. 5B is flow chart illustrating a portion of a backup process in accordance with an embodiment of the invention.

FIG. 5B is a flow chart of operations for processing the initial backup list 250 of step 506. The process of processing the initial backup list 250 begins at step 522. In step 522, the CDP module 130 selects the next item from the initial backup list 250.

In step 524, the CDP module obtains a timestamp of the selected item from the backup system 110 (i.e. backup system timestamp). In step 526, the CDP module 130 obtains the timestamp of the selected item from the client 120 (i.e. client timestamp). The backup system timestamp of an item is an indication of the time and date of the most recent save of that item in the backup system 110. Similarly, the client timestamp of an item is an indication of the time and date of the most recent save of that item in the client 120. In step 528, the CDP module 130 compares the timestamp from the backup system 110 to the timestamp from the client 120. If the timestamp of the item from the client 120 is more recent, then the timestamp of the item from the backup system 110 that indicates that the backup system 110 does not have the most recent version of the item. Accordingly, the item should be transmitted to the backup system 110 for backup on one or more storage devices 160. On the other hand, if the timestamp of the item from the backup system 110 is more recent or at the same time and date than that of the client 120 it indicates that the backup system 110 has the most recent version of the item. Thus, the item does not need to be transmitted to the backup system 110 for backup. Further, in some cases where the item has not yet been saved in the backup system 110 the backup system 110 will not have a timestamp. If the backup system 110 does not have a timestamp, then this indicates that the backup system 110 does not have the most recent version of the item. Accordingly, the item should be transmitted to the backup system 110 for backup on one or more storage devices 160.

Therefore, in step 528, if the CDP module 130 determines that the client timestamp is more recent than the backup system timestamp, then the process flows to step 530. Alternatively, in the case where the item has not yet been saved in the backup system 110, and no backup system timestamp exists for use in the comparison in step 528, the process flows to step 530. In step 530, the item is transmitted to the backup system 110 over network 150. The backup system 110 receives the transmission of the item and, in response, stores the item on one or more of the storage devices 160.

As discussed with respect to FIG. 3 above, the initial backup list 250 may be ordered in any number of ways according to policy 240. In one embodiment, the initial backup list 250 is ordered such that the most recently accessed item is first on the initial backup list 250. Accordingly, the CDP module 130 transmits the most recently accessed item to the backup system 110 over network 150 for storage in one or more storage devices 160. As discussed previously, often the most critical data is the data that is most recently accessed. Therefore, in this way, the CDP module 130 ensures that the most recently accessed data on the initial backup list 250 and, thus, the most critical data on the initial backup list is backed up first.

Although, not shown, the backup process, shown in step 530, could also have one or more confirmation steps similar to the steps (e.g. steps 512, 513, and 516) discussed with respect backing up the CDP backup list of FIG. 5A. Particularly, step 530 can include additional steps, such that, if the backup of the item transmitted on the initial backup list 250 is not successfully completed, then the item will be retransmitted for backup until the backup is successfully completed. Once the item is successfully transmitted to the backup system for backup the process flows to step 532.

Returning to step 528, if the CDP module determines that the client timestamp is not more recent than the backup system timestamp, then the process flows to step 532. In step 532, the CDP module 130 determines if the CDP backup list is empty. If the CDP module 130 determines that the CDP backup list 260 is not empty, then the process flows to step 534. Step 534 returns the process to step 508. In step 508, the throttle module 230 of the CDP module 130 throttles the initial backup process. As discussed above, in one embodiment, throttling the initial backup process includes slowing down the processing of the initial backup list 250 below the preliminary backup rate. In another embodiment, throttling the initial backup process includes pausing the processing of the initial backup list 250. Accordingly, the CDP module 130 does not selecting the next item on the initial backup list 250, and instead, performs a backup of the next item on the CDP backup list 260. Once the throttle module 230 throttles the initial backup process the CDP module 130 processes the CDP backup list 260 list by transmitting the next item on the CDP backup list 260 for backup as described above. On the other hand, if the CDP module 130 determines that the CDP backup list 260 is empty, then the process flows to step 536. In step 536, the CDP module 130 moves on to the next item on the initial backup list 250 until the initial backup process is throttled by the throttle module 230. Once the next item on the initial backup list 250 is selected the process flows to step 524, as described above.

In some embodiments, data is manipulated before it is transmitted to its storage location. Data compression and data deduplication are data management technologies that are useful to reduce the consumption of expensive resources, such as storage space and transmission bandwidth. Data compression is the process of encoding information using fewer bits than an unencoded representation would use. Data deduplication generally refers to the elimination of redundant subfiles (e.g. blocks, chunks, or extents) from data objects. Data compression and data deduplication will, hereinafter, be referred to simply as deduplication and compression, respectively.

In an additional embodiment, the computing environment 10 performs additional data operations such as compression. Consequently, the backup process of FIGS. 3, 4, 5A, and 5B can be further modified to create additional efficiencies. As one of ordinary skill in the art understands, compression is a processor-intensive data operation. Accordingly, it is beneficial to perform compression at the backup system 110 when the backup system's processor utilization is low so as to not further overload the processor 102 of backup system 110.

Further, the CDP module 130 may be deployed simultaneously to a large number of clients 120a, 120b . . . 120n within the computing environment 10 and all of the clients 120a, 120b . . . 120n within the computing environment 10 share the same backup system 110. Consequently, the network 150 between the many clients 120a, 120b . . . 120n and the backup system 110 may become overloaded during the backup process. Further, as discussed above, clients 120a, 120b . . . 120n may all be performing a backup at one time. Accordingly, the network usage of network 150 may become very high and create a bottleneck for the backup process. Therefore, during these high network usage times it would be advantageous to perform compression on a selected item for backup.

Accordingly, in an additional embodiment, the CDP module 130 determines if the processor utilization is low and if the network usage of network 150 is high in order to take advantage of efficiencies when processing the CDP backup list 260 and the initial backup list 250.

Returning to FIG. 5A, in which the CDP module processes the CDP backup list, an additional embodiment may be implemented to create efficiencies during the backup process of the CDP backup list 260. Specifically, in step 510, upon selecting the next item for backup, the CDP module 130 determines if the processor utilization of processor 102 in backup system 110 is less than a processor utilization threshold. The processor utilization is a measurement of the percent of the backup system processor's full capacity. The processor utilization threshold may be predetermined. In one embodiment, the processor utilization threshold may be 50-75 percent of the backup system processor's full capacity. In one embodiment, policy 240 includes the processor utilization threshold. If the processor utilization threshold is not less than the processor utilization threshold, then the process flows to step 510 discussed above with respect to FIG. 5A.

However, if the processor utilization threshold is less than the processor utilization, then the CDP module 130 determines if the network usage between the backup system 110 and the client 120 is greater than the network usage threshold. The network usage is a measurement of the percent of network's 150 full capacity between the backup system 110 and the client 120. The network usage threshold may be predetermined. In one embodiment, the network usage threshold may be fifty (50) to seventy-five (75) percent of the network's full capacity. In one embodiment, policy 240 includes the network usage threshold. If the network usage is not greater than the network usage threshold, then the process flows to step 510, as discussed above. However, if the network usage is greater than the network usage threshold, then the backup system 110 performs compression on the selected item for backup. Once the compression is performed the process flows to step 510 as discussed above.

Similarly, returning to FIG. 5B, in which the CDP module 130 processes the initial backup list 250, an additional embodiment may be implemented to create efficiencies during the backup process of the initial backup list 250. Specifically, in step 528, upon determining that the client timestamp is more recent than the backup system timestamp, or alternatively, that there is no timestamp for the item in the backup system 110, the CDP module 130 determines if the processor utilization of processor 102 of backup system 110 is less than a processor utilization threshold. If the processor utilization threshold is not less than the processor utilization threshold, then the process flows to step 530 discussed above with respect to FIG. 5B.

However, if the processor utilization threshold is less than the processor utilization, then the CDP module 130 determines if the network usage between the backup system 110 and the client 120 is greater than the network usage threshold. If the network usage is not greater than the network usage threshold, then the process flows to step 530 as discussed above. However, if the network usage is greater than the network usage threshold, then the backup system 110 performs compression on the selected item for backup. Once the compression is performed the process flows to step 530 as discussed above.

In one embodiment the computing environment 10 performs additional data operations such as deduplication. Accordingly, the backup process of FIGS. 3, 4, 5A, and 5B can be further modified to create additional efficiencies. More specifically, in one embodiment, the CDP module 110 includes source side deduplication ensuring that the select data on the client 120 is deduplicated. In this embodiment, to perform the deduplication the CDP module 110 chunks data into chunks or blocks and compares the chunks of data to detect duplicates. If a duplicate chunk or block is detected, then the duplicate chunk is replaced by a link, reference, or pointer to the unique copy of data. If one of the duplicated chunks is later modified, then only a backup of the changed block is created and stored in one or more storage devices 160.

Returning step 330 of FIG. 3, in one embodiment, in addition to the initial backup build module 210 scanning the local items stored on local storage 140 according to the initial backup profile, the initial backup build module 210 scans the items stored on local storage 140 to determine if blocks or chunks of the item have been deduplicated on backup system 110. In one embodiment, if it is determined that the blocks or chunks of an item have been deduplicated by backup system 110 and stored on one or more storage devices 160, then the initial backup list build module 210 preferentially performs a backup of the item. In one embodiment the initial backup list 250 may be ordered according to policy 240. Therefore, items that have been deduplicated by backup system 110, and stored on one or more storage devices 160, are ordered such that they are first on the initial backup list 250. Accordingly, during the operations of FIGS. 5A and 5B, the initial backup items which have been previously been deduplicated are backed up prior to initial backup items which have not been previously deduplicated. In an alternative embodiment, policy 240 may be set such that the items that have been deduplicated by backup system 110, and stored on one or more storage devices 160, may be immediately transmitted to the backup system 110 during the step of scanning the items of step 330 of FIG. 3. Accordingly, the item is not added to the initial backup list 250.

Returning to step 420 FIG. 4, in one embodiment, after the CDP module 130 obtains notification that one or more items are modified the CDP backup build module 220 scans the local items stored on local storage 140 to determine if blocks or chunks of the item have been deduplicated on backup system 110. In one embodiment, if it is determined that the blocks or chunks of an item have been deduplicated by backup system 110, and stored on one or more storage devices 160, then the CDP backup list build module 220 preferentially performs a backup of the item. In one embodiment, the CDP backup list 260 may be ordered according to policy 240. Therefore items that have been deduplicated by backup system 110, and stored on one or more storage devices 160, are ordered such that they are first on the CDP backup list 260. Accordingly, during the operations of FIGS. 5A and 5B the CDP items which have been previously been deduplicated are backed up prior to CDP items which have not been previously deduplicated. In an additional embodiment, policy 240 may be set such that the items that have been deduplicated by backup system 110 and stored on one or more storage devices 160 may be immediately transmitted to the backup system 110 during the scanning step, as described above. Accordingly, the item is not added to the CDP backup list 260.

Figure 6A:
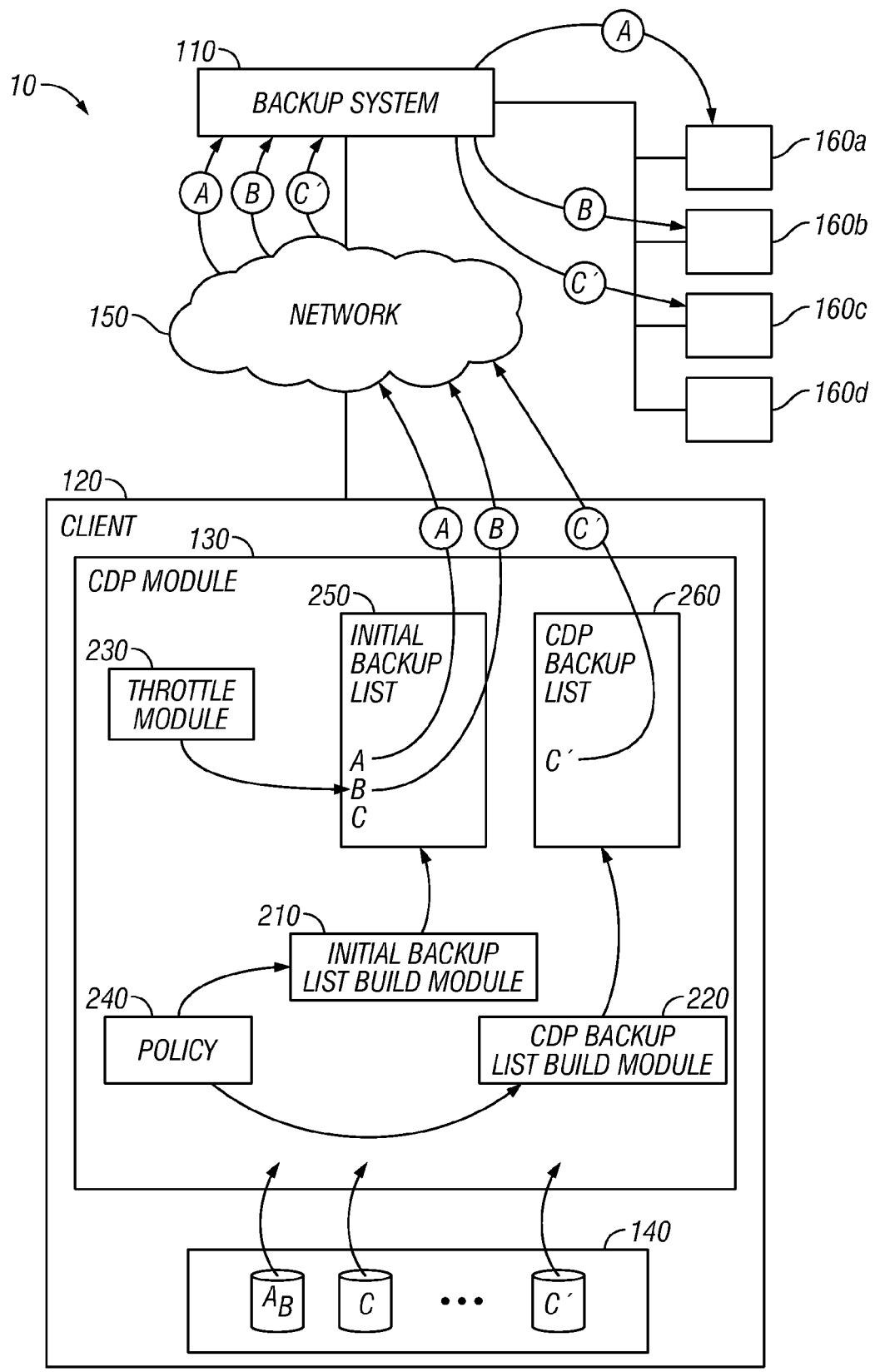
FIG. 6A is a diagram illustrating the performance of the computing environment in accordance with an embodiment of the invention.
Figure 6B:
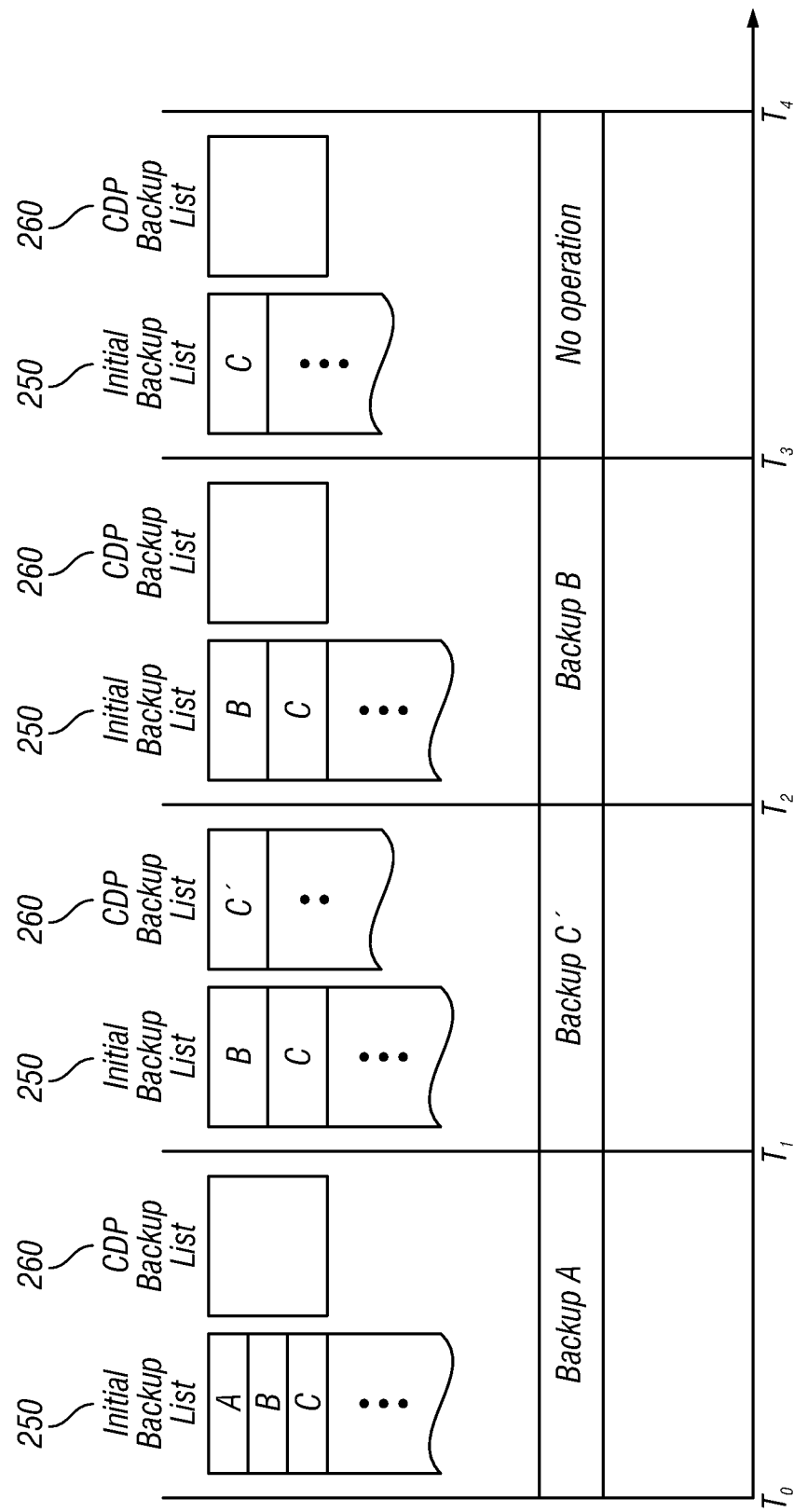
FIG. 6B is an exemplary timeline for a backup process in accordance with an embodiment of the invention.

FIG. 6A is a diagram illustrating the performance of the computing environment 10 during a backup process in accordance with one embodiment of the invention. FIG. 6B illustrates an exemplary timeline of the backup process illustrated in FIG. 6A, in accordance with one embodiment of the invention. For simplicity of discussion, FIGS. 6A and 6B will be discussed with respect to the embodiment in which throttling the initial backup list 250 includes pausing the processing of the initial backup list 250. However, one of ordinary skill in the art should understand that the description herein would also apply to other embodiments of the invention.

Referring to FIG. 6A, the computing environment 10 includes clients 120 connected through a network 150 to a backup system 110 for backing up items stored in local storage 140. For example, local storage 140 stores items A, B, C, and C' on one or more magnetic disk(s). The backup system 110 is connected to one or more storage devices 160a, 160b, 160c, and 160d. The client 120 includes a continuous data protection (CDP) module that prioritizes the order of items transmitted to the backup system 110 for storage on one or more storage devices 160 based on policy 240. The data that is the most critical to a user is often the most recently modified data. Accordingly, the CDP module 130 preferentially performs a backup of items on items that have been most recently modified.

In an example of an embodiment of the present invention, the computing environment 10 is able to identify all items that should be backed up in an initial backup process based on policy 240. The items that should be backed up in the initial backup process are added to the initial backup list 250. Further, the computing environment 10 is able to identify any items that are modified during the initial backup process. The items that have been modified during the initial backup process are added to the CDP backup list 260.

In addition, the CDP module 130 has the ability to order the items on the initial backup list 250 according to policy 240. Similarly, the CDP module 130 has the ability to order the items on the CDP backup list 260 according to policy 240. For example, in the embodiment shown in FIGS. 6A and 6B, the CDP module 130 orders the initial backup list 250 such that the most recently accessed items are listed first. Turning to FIG. 6B, starting at time zero ($T_0$) the initial backup list 250 includes items A, B, and C, and the CDP backup list 260 does not include any CDP items for backup. Item A is the most recently accessed item on client 120 and accordingly, item A is listed first. Similarly, item B is accessed more recently than item C, therefore item B is listed before item C in the initial backup list. Consequently, during the backup process described in further below, item A, the most recently accessed item, will be backed up prior to items B and C.

In accordance with the operations described in FIGS. 5A and 5B, the CDP module 130 determines if the CDP backup list 260 has items listed that require a backup. As shown in FIG. 6B, at $T_0$, the CDP list does not include items that require backup. Consequently, as shown in FIG. 6A, the CDP module 130 selects the next item from the initial backup list 250. In this example, the next item on the initial backup list 250 is item A. The CDP module 130 obtains a timestamp of item A from the backup system 110 and a timestamp of item A from the client 120 and compares the timestamps. In this example, the client timestamp is more recent than the backup system timestamp, indicating that the most recent version of item A is stored on the client. Therefore, the CDP module 130 transmits item A to the backup system 110 over network 150. Backup system 110 receives the transmission of item A and, in response, stores item A on one or more of the storage devices 160 as described above. For example, in this embodiment, item A is stored on disk array 160a.

Once item A is stored on disk array 160a, the CDP module 130 determines if the CDP backup list 260 has items listed that require a backup. In this example, at time one ($T_1$), after $T_0$, the initial backup list 250 includes items B and C. In addition, the CDP backup list 260 includes item C', wherein item C' is item C modified. Thus, it is determined that the CDP backup list 260 is not empty and the throttle module 230 pauses the initial backup process of initial backup list 250 as shown in FIG. 6A. Subsequently, the CDP module transmits item C' to the backup system 110 over network 150. Backup system 110 receives the transmission of item C' and, in response, stores item C' on one or more of the storage devices 160 as described above. For example, in this embodiment, item C' is stored on tape array 160c.

Once item C' is stored on tape array 160c, the CDP module 130 determines if the CDP backup list 260 has items listed that require a backup. As shown in FIG. 6B, at time two ($T_2$), after $T_1$, the CDP list does not include items that require backup. However, the initial backup list 250 includes items B and C for backup. Consequently, as shown in FIG. 6A, the CDP module 130 selects the next item from the initial backup list 250. In this example, the next item on the initial backup list 250 is item B. The CDP module 130 obtains a timestamp of item B from the backup system 110 and a timestamp of item B from the client 120 and compares the timestamps. In this example, the client timestamp is more recent than the backup system timestamp, indicating that the most recent version of item B is stored on the client. Therefore, the CDP module 130 transmits item B to the backup system 110 over network 150. Backup system 110 receives the transmission of item B and, in response, stores item B on one or more of the storage devices 160 as described above. For example, in this embodiment, item B is stored on disk array 160b.

After item B is stored on disk array 160b, the CDP module 130 determines if the CDP backup list 260 has items listed that require a backup. As shown in FIG. 6B, at time three ($T_3$), after $T_2$, the CDP list does not include items that require backup. However, the initial backup list 250 includes item C for backup. Consequently, as shown in FIG. 6A, the CDP module 130 selects the next item from the initial backup list 250. In this example, the next item on the initial backup list 250 is item C. The CDP module 130 obtains a timestamp of item C from the backup system 110 and a timestamp of item C from the client 120 and compares the timestamps. In the current example, the timestamp of item C from the backup system is at $T_2$ when item C was modified and backed up as C'. Therefore, the client timestamp is not more recent than the backup system timestamp. Accordingly, item C is not transmitted to the backup system 110 for backing up. This is shown in FIG. 6B as no operation being performed.

The process continues with the CDP module 130 determining if the CDP backup list 260 has items listed that require a backup. This process may continue indefinitely, as described in FIGS. 5A and 5B, as items are added to the initial backup list 250 and/or CDP backup list 260. As necessary, the CDP module 130 backs up items on the CDP backup list 260 preferentially over items listed in the initial backup list 250.

It should be appreciated that such operations can be embodied as a method implemented as an algorithm having software modules that are implemented by a computing system. Further, the method can be embodied as software on any computer readable media, as dedicated firmware, or as a combination of software and firmware, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The term logic may include, by way of example, software, hardware, firmware, and/or combinations of software and hardware.

Figure 7:
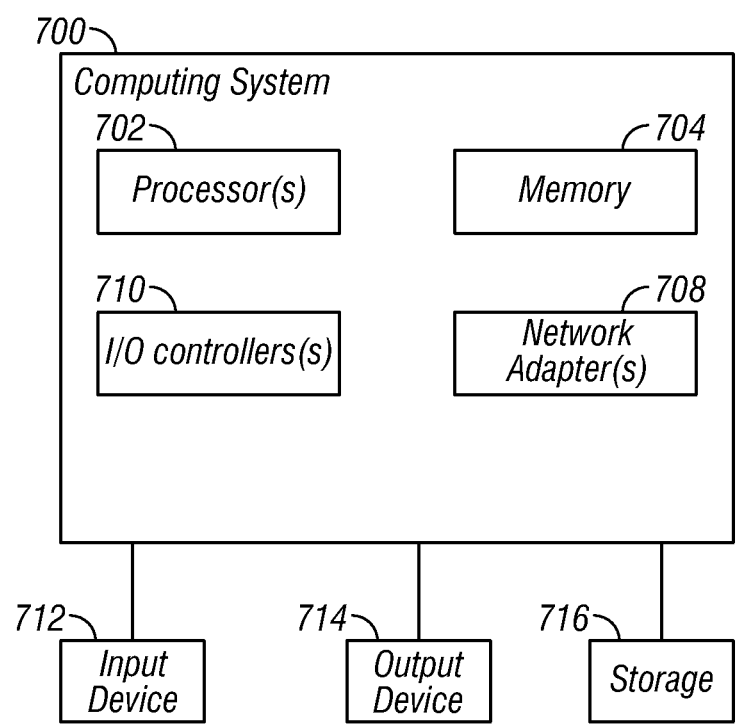
FIG. 7 illustrates a computing system that may be used in accordance with certain embodiments.

FIG. 7 illustrates a computing system 700 that may be used in accordance with certain embodiments. Client 120 and/or backup system 110 may implement computing system 700. The computing system 700 is suitable for storing and/or executing program code and includes at least one processor 702 coupled directly or indirectly to memory elements 704 through a system bus (not shown). The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system and one or more computer programs (not shown).

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computing system 700 may be coupled to storage 716 (e.g., a non-volatile storage area, such as magnetic disk drives, optical disk drives, a tape drive, solid state storage devices, etc.). The storage 716 may comprise an internal storage device or an attached or network accessible storage. Computer programs in storage 716 may be loaded into the memory elements 704 and executed by a processor 702 in a manner known in the art.

The computing system 700 may include fewer components than illustrated, additional components not illustrated herein, or some combination of the components illustrated and additional components. The computing system 700 may comprise any computing device known in the art, such as a mainframe, server, personal computer, workstation, laptop, handheld computer, telephony device, network appliance, virtualization device, storage controller, mobile device, for example a personal digital assistant (PDA) or mobile phone, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer implemented method for prioritizing a backup process in a computing environment having at least one client coupled to a backup system, the method comprising:

performing an initial backup process of an initial backup list of a first client at a preliminary backup rate, wherein said initial backup list includes at least one initial backup item;

adding items modified during performance of said initial backup process of said first client as continuous data protection (CDP) items on a CDP list of said first client;

while performing said initial backup process of said initial backup list of said first client, determining if said CDP list of said first client includes at least one CDP item that has been modified during performance of said initial backup process of said first client;

throttling said initial backup process of said initial backup list of said first client below said preliminary backup rate in response to determining that said CDP list includes at least one CDP item that has been modified during performance of said initial backup process of said first client, wherein said throttling said initial backup process comprises at least one of pausing said initial backup process of said initial backup list of said first client and slowing said initial backup process of said initial backup list of said first client below said preliminary backup rate;

performing a CDP backup of said at least one CDP item that has been modified during performance of said initial backup process client while said initial backup process of said initial backup list of said first client is below said preliminary backup rate.

2. The computer implemented method of claim 1, wherein said at least one initial backup item and said at least one CDP item are an initial backup file and a CDP file, respectively.

3. The computer implemented method of claim 1, further comprising:
resuming the performance of said initial backup process of said initial backup list of said first client at a preliminary backup rate in response to determining that said CDP list of said first client does not include at least one CDP item for backup.

4. The computer implemented method of claim 1, further comprising:
comparing a backup system timestamp of said at least one initial backup item with a client timestamp of said at least one initial backup item; and
transmitting said at least one initial backup item for back up to said backup system only if said client timestamp is more recent than said backup system timestamp.

5. The computer implemented method of claim 1, further comprising wherein the CDP backup list includes a plurality of CDP items, ordering said plurality of CDP items on said CDP backup list according to policy such that said CDP items are backed up preferentially based on said order.

6. The computer implemented method of claim 5, wherein said policy orders said plurality of CDP items on said CDP backup list based on a time of the last modification of said CDP item, such that the most recently modified CDP item is backed up first.

7. The computer implemented method of claim 5, wherein said policy orders said plurality of CDP items on said CDP backup list such that said CDP items which have previously been deduplicated are backed up prior to CDP items which have not been previously deduplicated.

8. The computer implemented method of claim 1, further comprising wherein the initial backup list includes a plurality of initial backup items, ordering said plurality of initial backup items on said initial backup list according to policy such that said initial backup items which have previously been deduplicated are backed up prior to initial backup items which have not been previously deduplicated.

9. The computer implemented method of claim 1, further comprising:
selecting one item from one of the CDP backup list and said initial backup list of said first client;
determining if a processor utilization of said backup system is less than a processor utilization threshold;
determining if the network usage between said first client and said backup system is greater than a network usage threshold; and
in response to the processor utilization of said backup system being less than said processor utilization threshold and said network usage between said first client and said backup system is greater than said network usage threshold performing compression on said selected item.

10. A non-transitory computer-readable storage medium having executable instructions stored thereon for causing components of a computing environment to perform a method, wherein the computing environment has at least one client coupled to a backup system, the method comprising:
performing an initial backup process of an initial backup list of a first client at a preliminary backup rate, wherein said initial backup list includes at least one initial backup item;
adding items modified during performance of said initial backup process of said first client as continuous data protection (CDP) items on a CDP list of said first client;
while performing said initial backup process of said initial backup list of said first client, determining if said CDP list of said first client includes at least one CDP item that has been modified during performance of said initial backup process of said first client;
throttling said initial backup process of said initial backup list of said first client below said preliminary backup rate in response to determining that said CDP list includes at least one CDP item that has been modified during performance of said initial backup process of said first client, wherein said throttling said initial backup process comprises at least one of pausing said initial backup process of said initial backup list of said first client and slowing said initial backup process of said initial backup list of said first client below said preliminary backup rate;
performing a CDP backup of said at least one CDP item that has been modified during performance of said initial backup process client while said initial backup process of said initial backup list of said first client is below said preliminary backup rate.

11. The computer-readable storage medium of claim 10, further including instructions for resuming the performance of said initial backup process of said initial backup list of said first client at said preliminary backup rate in response to determining that said CDP list of said first client does not include at least one CDP item for backup.

12. The computer-readable storage medium of claim 10, further including instructions for:
comparing a backup system timestamp of said at least one initial backup item with a client timestamp of said at least one initial backup item; and
transmitting said at least one initial backup item for back up to said backup system only if said client timestamp is more recent than said backup system timestamp.

13. The computer-readable storage medium of claim 10, further including instructions for ordering a plurality of CDP items on said CDP backup list according to policy such that said CDP items are backed up preferentially based on said order.

14. The computer-readable storage medium of claim 13, wherein said policy orders said plurality of CDP items on said CDP backup list based on a time of the last modification of said CDP item, such that the most recently modified CDP item is backed up first.

15. The computer-readable storage medium of claim 13, wherein said policy orders said plurality of CDP items on said CDP backup list such that said CDP items which have previously been deduplicated are backed up prior to CDP items which have not been previously deduplicated.

16. The computer-readable storage medium of claim 10, further including instructions for ordering a plurality of initial backup items on said initial backup list according to policy such that said initial backup items which have previously been deduplicated are backed up prior to initial backup items which have not been previously deduplicated.

17. The computer-readable storage medium of claim 10, further including instructions for:
selecting one item from one of the CDP backup list and said initial backup list of said first client;
determining if a processor utilization of said backup system is less than a processor utilization threshold;
determining if the network usage between said first client and said backup system is greater than a network usage threshold; and
performing compression on said selected item in response to the processor utilization of said backup system being less than said processor utilization threshold and said network usage between said first client and said backup system is greater than said network usage threshold.

18. A computing environment comprising:
at least one client coupled to a backup system, wherein said at least one client includes a first client, and said first client includes a processor and a memory coupled to said processor;
said memory including computer-readable instructions implemented by said processor to:
perform an initial backup process of an initial backup list of a first client at a preliminary backup rate, wherein said initial backup list includes at least one initial backup item;
add items modified during performance of said initial backup process of said first client as continuous data protection (CDP) items on a CDP list of said first client;
while performing said initial backup process of said initial backup list of said first client, determine if said CDP list of said first client includes at least one CDP item that has been modified during performance of said initial backup process of said first client;
throttle said initial backup process of said initial backup list of said first client below said preliminary backup rate in response to a determination that said CDP list includes at least one CDP item that has been modified during performance of said initial backup process of said first client, wherein said throttle of said initial backup process comprises at least one of pausing said initial backup process of said initial backup list of said first client and slowing said initial backup process of said initial backup list of said first client below said preliminary backup rate;
perform a CDP backup of said at least one CDP item that has been modified during performance of said initial backup process client while said initial backup process of said initial backup list of said first client is below said preliminary backup rate.

19. The computing environment of claim 18, further comprising the computer-readable instructions implemented by said processor to:
resume the performance of said initial backup process of said initial backup list of said first client at said preliminary backup rate in response to determining that said CDP list of said first client does not include at least one CDP file for backup.

20. The computing environment of claim 18, further comprising the computer-readable instructions implemented by said processor to:
compare a backup system timestamp of said at least one initial backup file with a client timestamp of said at least one initial backup file; and
transmit said at least one initial backup file for back up to said backup system only if said client timestamp is more recent than said backup system timestamp.

21. The computing environment of claim 18, further comprising the computer-readable instructions implemented by said processor to order a plurality of CDP files on said CDP backup list according to policy such that said CDP files are backed up preferentially based on said order.

22. The computing environment of claim 18, further comprising the computer-readable instructions implemented by said processor to order said plurality of CDP files on said CDP backup list based on a time of the last modification of said CDP file, such that the most recently modified CDP file is backed up first.

23. The computing environment of claim 18, further comprising the computer-readable instructions implemented by said processor to order said plurality of CDP files on said CDP backup list such that said CDP files which have previously been deduplicated are backed up prior to CDP files which have not been previously deduplicated.

24. The computing environment of claim 18, further comprising the computer-readable instructions implemented by said processor to order a plurality of initial backup files on said initial backup list according to policy such that said initial backup files which have previously been deduplicated are backed up prior to initial backup files which have not been previously deduplicated.

25. The computing environment of claim 18, further comprising the computer-readable instructions implemented by said processor to:
select one file from one of the CDP backup list and said initial backup list of said first client;
determine if a processor utilization of said backup system is less than a processor utilization threshold;
determine if the network usage between said first client and said backup system is greater than a network usage threshold; and
in response to the processor utilization of said backup system being less than said processor utilization threshold and said network usage between said first client and said backup system is greater than said network usage threshold perform compression on said selected file.

* * * * *